US008428129B2

United States Patent
Wu et al.

(10) Patent No.: US 8,428,129 B2
(45) Date of Patent: Apr. 23, 2013

(54) METHOD AND APPARATUS FOR ENCODING AND/OR DECODING VIDEO DATA USING ENHANCEMENT LAYER RESIDUAL PREDICTION FOR BIT DEPTH SCALABILITY

(75) Inventors: Yu Wen Wu, Beijing (CN); Yong Ying Gao, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 462 days.

(21) Appl. No.: 12/448,151

(22) PCT Filed: Dec. 14, 2006

(86) PCT No.: PCT/CN2006/003415
§ 371 (c)(1),
(2), (4) Date: Jun. 10, 2009

(87) PCT Pub. No.: WO2008/071037
PCT Pub. Date: Jun. 19, 2008

(65) Prior Publication Data
US 2010/0008418 A1    Jan. 14, 2010

(51) Int. Cl.
*H04N 7/26* (2006.01)
*H04N 7/46* (2006.01)
*H04N 11/02* (2006.01)
*H04N 11/04* (2006.01)

(52) U.S. Cl.
USPC ............ 375/240.12; 375/240.01; 375/240.16; 375/240.21; 375/240.26

(58) Field of Classification Search . 375/240.01–240.26
See application file for complete search history.

(56) References Cited

U.S. PATENT DOCUMENTS

| 5,973,739 | A | * | 10/1999 | Nilsson ..................... 375/240.1 |
| 6,836,512 | B2 | | 12/2004 | Van Der Schaar et al. |
| 2002/0071486 | A1 | * | 6/2002 | Van Der Schaar et al. ......................... 375/240.01 |
| 2002/0118742 | A1 | | 8/2002 | Puri et al. |
| 2003/0086622 | A1 | * | 5/2003 | Klein Gunnewiek et al. ............................. 382/240 |
| 2004/0017949 | A1 | * | 1/2004 | Lin et al. ..................... 382/232 |

(Continued)

FOREIGN PATENT DOCUMENTS

| CN | 1457605 A | 11/2003 |
| CN | 1636394 A | 7/2005 |
| CN | 1810036 A | 7/2006 |

OTHER PUBLICATIONS

Search Report Dated Sep. 13, 2007.

*Primary Examiner* — Joseph Ustaris
*Assistant Examiner* — On S Mung
(74) *Attorney, Agent, or Firm* — Tutunjian & Bitetto, P.C.

(57) ABSTRACT

A scalable video bitstream may have an H.264/AVC compatible base layer and a scalable enhancement layer, where scalability refers to color bit depth. The H.264/AVC scalability extension SVC provides also other types of scalability, e.g. spatial scalability where the number of pixels in BL and EL are different. According to the invention, BL information is upsampled in two logical steps, one being texture upsampling and the other being bit depth upsampling. Texture upsampling is a process that increases the number of pixels, and bit depth upsampling is a process that increases the number of values that each pixel can have, corresponding to the pixels color intensity. The upsampled BL data are used to predict the collocated EL. The BL information is upsampled at the encoder side and in the same manner at the decoder side, wherein the upsampling refers to spatial and bit depth characteristics.

12 Claims, 6 Drawing Sheets

U.S. PATENT DOCUMENTS

| | | |
|---|---|---|
| 2004/0252767 A1* | 12/2004 | Bruls et al. ............... 375/240.21 |
| 2005/0141617 A1* | 6/2005 | Kim et al. ................ 375/240.21 |
| 2005/0259729 A1 | 11/2005 | Sun |
| 2005/0265442 A1* | 12/2005 | Kim ........................... 375/240.1 |
| 2006/0133503 A1* | 6/2006 | Park et al. ................ 375/240.16 |
| 2006/0153295 A1* | 7/2006 | Wang et al. .............. 375/240.08 |
| 2006/0193384 A1 | 8/2006 | Boyce |
| 2006/0222079 A1* | 10/2006 | Park et al. ................ 375/240.16 |
| 2006/0233250 A1* | 10/2006 | Cha et al. ................. 375/240.12 |
| 2006/0257034 A1* | 11/2006 | Gish et al. ..................... 382/239 |
| 2007/0014351 A1* | 1/2007 | Lee et al. ................. 375/240.03 |
| 2007/0286283 A1* | 12/2007 | Yin et al. ................. 375/240.16 |

* cited by examiner

Fig. 2 (Intra-encoder)

Fig.3 (Inter-encoder)

METHOD AND APPARATUS FOR ENCODING AND/OR DECODING VIDEO DATA USING ENHANCEMENT LAYER RESIDUAL PREDICTION FOR BIT DEPTH SCALABILITY

This application claims the benefit, under 35 U.S.C. §365 of International Application PCT/CN2006/003415, filed Dec. 14, 2006, which was published in accordance with PCT Article 21(2) on Jun. 19, 2008 in English.

FIELD OF THE INVENTION

The invention relates to the technical field of digital video coding. It presents a coding solution for a novel type of scalability: bit depth scalability.

BACKGROUND

In recent years, higher color depth rather than the conventional eight bit color depth is more and more desirable in many fields, such as scientific imaging, digital cinema, high-quality-video-enabled computer games and professional studio and home theatre related applications. Accordingly, the state-of-the-art video coding standard H.264/AVC has already included Fidelity Range Extensions (FRExt), which support up to 14 bits per sample and up to 4:4:4 chroma sampling. The current SVC reference software JSVM does not support high bit depth.

However, none of the existing advanced coding solutions supports bit depth scalability. For a scenario with two different decoders, or clients with different requests for the bit depth, e.g. 8 bit and 12 bit for the same raw video, the existing H.264/AVC solution is to encode the 12-bit raw video to generate a first bitstream, and then convert the 12-bit raw video to an 8-bit raw video and encode it to generate a second bitstream. If the video shall be delivered to different clients who request different bit depths, it has to be delivered twice, e.g. the two bitstreams are put in one disk together. This is of low efficiency regarding both the compression ratio and the operational complexity.

The European Patent application EP06291041 discloses a scalable solution to encode the whole 12-bit raw video once to generate one bitstream that contains an H.264/AVC compatible base layer (BL) and a scalable enhancement layer (EL). The overhead of the whole scalable bitstream compared to the above-mentioned first bitstream is small compared to the additional second bitstream. If an H.264/AVC decoder is available at the receiving end, only the BL sub-bitstream is decoded, and the decoded 8-bit video can be viewed on a conventional 8-bit display device; if a bit depth scalable decoder is available at the receiving end, both the BL and the EL sub-bitstreams may be decoded to obtain the 12-bit video, and it can be viewed on a high quality display device that supports color depths of more than eight bit.

SUMMARY OF THE INVENTION

The H.264/AVC scalability extension SVC provides also other types of scalability, e.g. spatial scalability. In spatial scalability the number of pixels in BL and EL are different. Thus, the problem arises how to combine bit depth scalability with other scalability types, and in particular spatial scalability. The present invention provides a solution for this problem.

Claim 1 discloses a method for encoding that allows the combination of bit depth scalability and other scalability types. Claim 5 discloses a corresponding decoding method.

An apparatus that utilizes the method for encoding is disclosed in claim 10, and an apparatus that utilizes the method for decoding is disclosed in claim 11.

According to the invention, BL information is upsampled in two logical steps, one being texture upsampling and the other being bit depth upsampling. Texture upsampling is a process that increases the number of pixels, and bit depth upsampling is a process that increases the number of values that each pixel can have. The value corresponds to the color intensity of the pixel. The upsampled BL unit is used to predict the collocated EL unit. An encoder generates a residual from the EL video data, and the residual may be further encoded (usually entropy coded) and transmitted. The BL information to be upsampled can be of any granularity, e.g. units of single pixels, pixel blocks, macroblocks (MBs) or whole images. Further, it is possible to perform the two logical upsampling steps in a single step. The base layer information is upsampled at the encoder side and in the same manner at the decoder side, wherein the upsampling refers to spatial and bit depth characteristics.

Moreover, the combined spatial and bit depth upsampling can be performed for intra coded as well as for inter coded images.

In particular, a method for encoding video data having a base layer and an enhancement layer, wherein pixels of the base layer have less bit depth and lower spatial resolution than pixels of the enhancement layer, comprises the steps of upsampling base layer information, wherein a predicted version of enhancement layer information is obtained that has higher color resolution and higher spatial resolution than the base layer, generating an enhancement layer residual being the difference between the enhancement layer information and said predicted version of enhancement layer information, and encoding the base layer information and the enhancement layer residual.

According to one aspect of the invention, a method for decoding video data comprises the steps of
receiving quantized and (e.g. DCT-) transformed enhancement layer information and base layer information,
performing inverse quantization and inverse transformation on the received information,
upsampling inverse quantized and inverse transformed base layer information, wherein the number of pixels and the value depth per pixel are increased and wherein predicted enhancement layer information is obtained, and reconstructing from the predicted enhancement layer information and the inverse quantized and inverse transformed enhancement layer information reconstructed enhancement layer video information.

In one embodiment of the invention, the method for encoding comprises steps of intra-encoding BL information, reconstructing the intra-encoded BL information, performing spatial upsampling and color bit depth upsampling on the reconstructed BL information, and generating an EL residual being the difference between current EL information (i.e. image data) and said spatially and color bit depth upsampled BL information (i.e. image data).

In one embodiment of the invention, the method for encoding comprises steps of generating a BL residual being the difference between current BL image data and predicted BL image data (as usual for inter-coded BL), wherein the predicted BL image data can be predicted from data of the current or a previous BL image, encoding (i.e. transforming and quantizing) said BL residual, reconstructing (inverse transforming and inverse quantizing) the encoded BL residual, performing residual (spatial) upsampling and color bit depth upsampling on the reconstructed BL residual and generating an EL inter-layer residual being the difference between current EL residual data and said spatially and color bit depth upsampled reconstructed BL residual.

Advantageously, the two mentioned encoder embodiments can be combined into a combined encoder that can adaptively encode intra- and inter-encoded video data.

In one embodiment of the invention, the method for decoding further comprises steps of (implicitly) detecting that the received BL information is intra-coded, reconstructing BL video from the received inverse quantized and inverse transformed BL information, upsampling the reconstructed BL video, wherein the upsampling comprises texture (spatial) upsampling and bit depth upsampling and wherein predicted EL information is obtained, and reconstructing from the predicted EL information and the inverse quantized and inverse transformed received EL information reconstructed EL video information.

In one embodiment of the invention, the method for decoding comprises steps of (implicitly) detecting that received BL data are inter-coded, extracting a BL residual from the received BL data, performing residual (spatial) upsampling and color bit depth upsampling on the extracted BL residual, extracting an EL residual from the inverse quantized and inverse transformed EL information, reconstructing from the EL residual and the upsampled BL residual a reconstructed EL residual and reconstructing from the reconstructed EL residual and previously reconstructed EL information reconstructed EL video information.

Advantageously, the two mentioned decoder embodiments can be combined into a combined decoder that can adaptively decode intra- and inter-encoded video data.

According to another aspect of the invention, an apparatus for encoding video data having a base layer and an enhancement layer, wherein the base layer has lower color resolution and lower spatial resolution than the enhancement layer, comprises means for upsampling base layer information, wherein a predicted version of enhancement layer information is obtained that has higher color resolution and higher spatial resolution than the base layer, means for generating an enhancement layer residual being the difference between the enhancement layer information and said predicted version of enhancement layer information, and means for encoding the base layer information and the enhancement layer residual.

In one embodiment of the invention, an apparatus for encoding or decoding video data comprises means for performing spatial (residual or texture) upsampling and means for performing color bit depth upsampling, wherein the means for spatial upsampling increases the number of values within the BL information and the means for color bit depth upsampling increases the color range of the values and wherein spatially and color bit depth upsampled BL data are obtained.

According to another aspect of the invention, an encoded scalable video signal comprises intra-coded BL data and intra-coded EL data, wherein the intra-coded EL data comprises a residual being the difference between an upsampled BL image and an EL image, wherein the residual comprises differential texture information and differential bit depth information.

Various embodiments of the presented coding solution are compatible to H.264/AVC and all kinds of scalability that are currently defined in H.264/AVC scalable extension (SVC)

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a framework of color bit depth scalable coding.

DETAILED DESCRIPTION OF THE INVENTION

Figure 1:
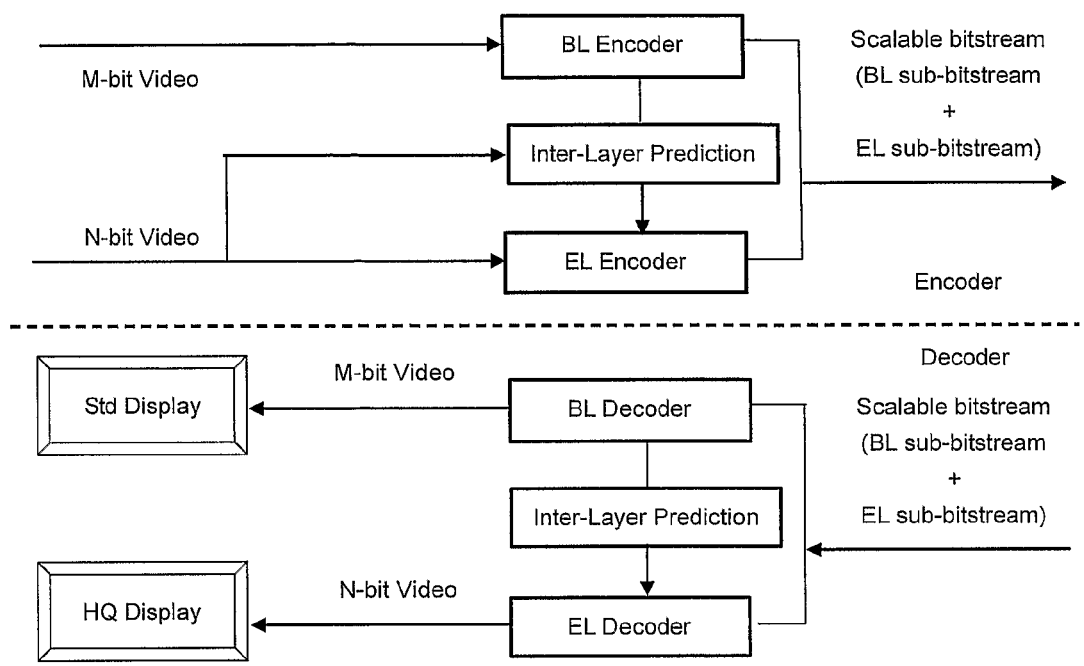

As shown in FIG. 1, two videos are used as input to the video encoder: N-bit raw video and M-bit (M<N, usually M=8) video. The M-bit video can be either decomposed from the N-bit raw video or given by other ways. The scalable solution can reduce the redundancy between two layers by using pictures of the BL. The two video streams, one with 8-bit color and the other with N-bit color (N>8), are input to the encoder, and the output is a scalable bit-stream. It is also possible that only one N-bit color data stream is input, from which an M-bit (M<N) color data stream is internally generated for the BL. The M-bit video is encoded as the BL using the included H.264/AVC encoder. The information of the BL can be used to improve the coding efficiency of the EL. This is called inter-layer prediction herein. Each picture—a group of MBs—has two access units, one for the BL and the other one for the EL. The coded bitstreams are multiplexed to form a scalable bitstream. The BL encoder comprises e.g. an H.264/AVC encoder, and the reconstruction is used to predict the N-bit color video, which will be used for the EL encoding.

As shown in FIG. 1, the scalable bit-stream exemplarily contains an AVC compliant BL bit-stream, which can be decoded by a BL decoder (conventional AVC decoder). Then the same prediction as in the encoder will be done at the decoder side (after evaluation of a respective indication) to get the predicted N-bit video. With the N-bit predicted video, the EL decoder will then use the N-bit prediction to generate the final N-bit video for a High Quality display HQ.

In the following, when the term color bit depth is used it means bit depth, i.e. the number of bits per value. This is usually corresponding to color intensity.

In one embodiment, the present invention is based on the current structure of SVC spatial, temporal and quality scalability, and is enhanced by bit depth scalability for enhanced color bit depth. Hence, this embodiment is completely compatible to current SVC standard. However, it will be easy for the skilled person to adapt it to other standards. The key of bit depth scalability is the bit depth inter-layer prediction. By using the inter-layer prediction, the difference between the N-bit and M-bit video is encoded as the EL. For the convenience of statements, the following denotations will be used in the following:

$BL_{org}$: base layer original MB
$BL_{res}$: base layer residual MB
$BL_{rec}$: base layer reconstructed MB
$EL_{org}$: enhancement layer original MB $EL_{rec}$: enhancement layer reconstructed MB
$EL'_{res}$: enhancement layer residual MB
$Pre_c\{\ \}$: color bit depth inter-layer prediction operator
$Pre_t\{\ \}$: texture (spatial) inter-layer prediction operator
$Pre_r\{\ \}$: residual (spatial) inter-layer prediction operator Exemplarily, the SVC compatible MB level bit depth scalable coding solution is based on the current SVC spatial scalability. The following provides a detailed description of the extension of the spatial scalability to bit depth scalability for both intra coding and inter coding. The first step of SVC compatible bit depth scalable coding is to support high bit coding as what the H.264/AVC FRExt extension does (currently 10 to 14 bits per sample) in the EL encoding and decoding.

Intra Coding

Figure 2:
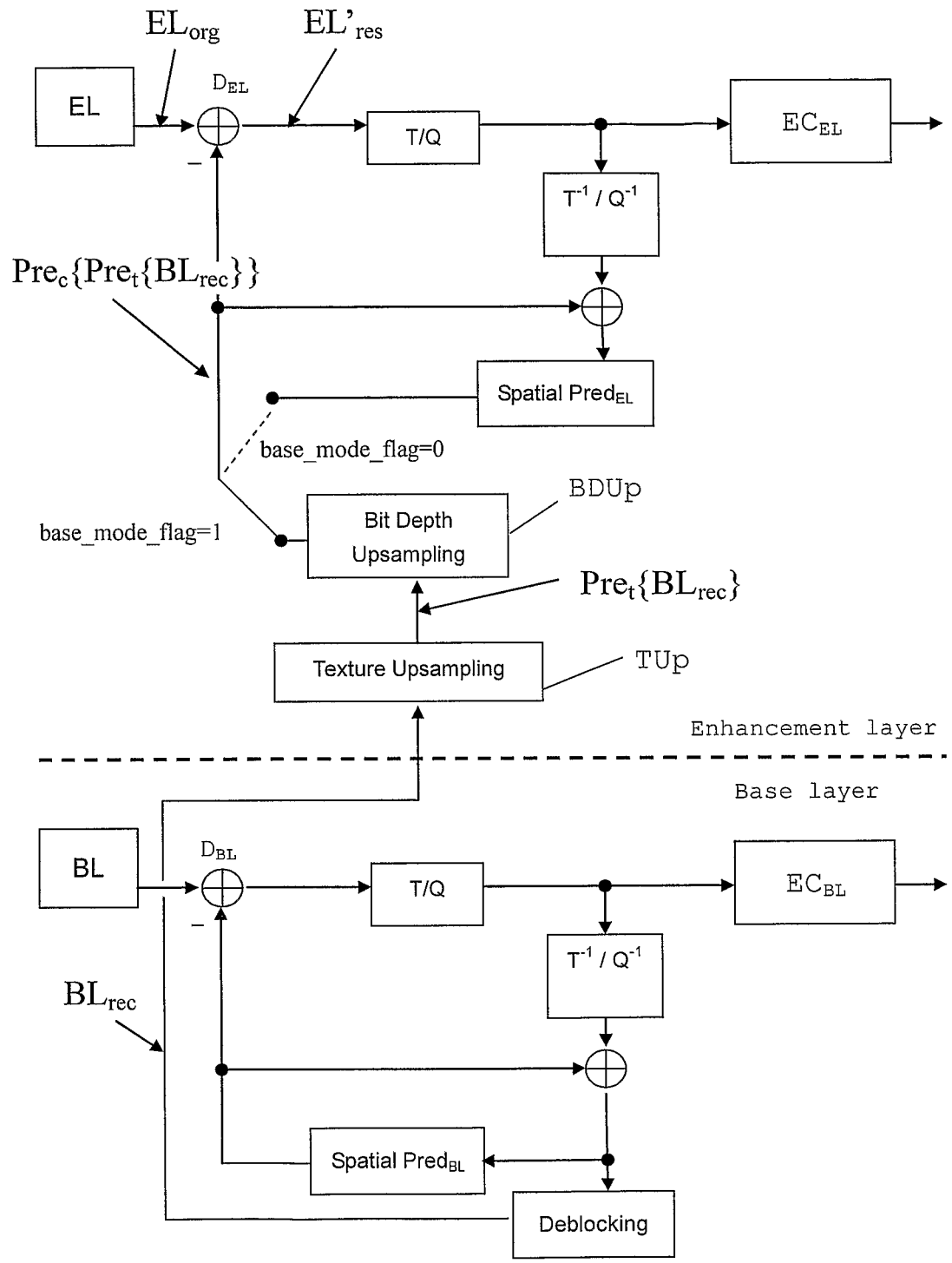
FIG. 2 an encoder for the extension of the intra texture inter-layer prediction of spatial scalability to color bit depth scalability.

FIG. 2 shows an encoder for the extension of intra texture inter-layer prediction of spatial scalability, as used in the current SVC standard, to bit depth scalability. The bit depth upsampling block BDUp represents the extension to bit depth scalability, while the other blocks represent the spatial scalability in the current SVC standard. This block BDUp is the difference between a conventional SVC intra encoder and the intra encoder according to the invention. In FIG. 2, M-bit base layer MBs are input to the BL encoder, and N-bit enhancement layer MBs are input to the EL encoder (N>M). In the current SVC standard, the texture upsampling was designed for spatial intra texture inter-layer prediction. In FIG. 2 the input to texture upsampling TUp is the reconstructed BL macroblock $BL_{rec}$, and the output is the spatially (texture) predicted version of the EL macroblock $Pre_t\{BL_{rec}\}$. The bit depth scalability is realized by the step of bit depth upsampling BDUp that (in this example) directly follows texture upsampling TUp. In practice, it is often advantageous to apply the texture upsampling as a spatial inter-layer prediction first, and then the bit depth upsampling BDUp is done as a bit depth inter-layer prediction. With both the texture upsampling TUp and the bit depth upsampling BDUp, a predicted version $Pre_c\{Pre_t\{BL_{rec}\}\}$ of the N-bit EL macroblock is obtained. A similar residual could be obtained by reverse order of the prediction steps.

The residual $EL'_{res}$ between the original N-bit EL macroblock $EL_{org}$ and its predicted version $Pre_c\{Pre_t\{BL_{rec}\}\}$ is obtained by a difference generator DEL. The residual is in one embodiment of the invention further transformed T, quantized Q and entropy encoded $EC_{EL}$ to form the EL sub-bitstream, like in SVC. In a mathematical expression, the residual of color bit depth intra upsampling is $$EL'_{res}=EL_{org}-Pre_c\{Pre_t\{BL_{rec}\}\}, \quad \text{(Eq.1)}$$

where $Pre_t\{\ \}$ represents the texture upsampling operator.

Different variations of the encoding process are possible, and can be controlled by control parameters. An exemplary flag base_mode_flag is shown in FIG. 2 that decides whether EL residuals are predicted based on reconstructed EL information or based on upsampled BL information.

Inter Coding

Bit depth scalability for inter-coding is implemented different from that for intra-coding. In the current SVC standard, motion upsampling and residual upsampling were designed for spatial inter texture inter-layer prediction.

Figure 3:
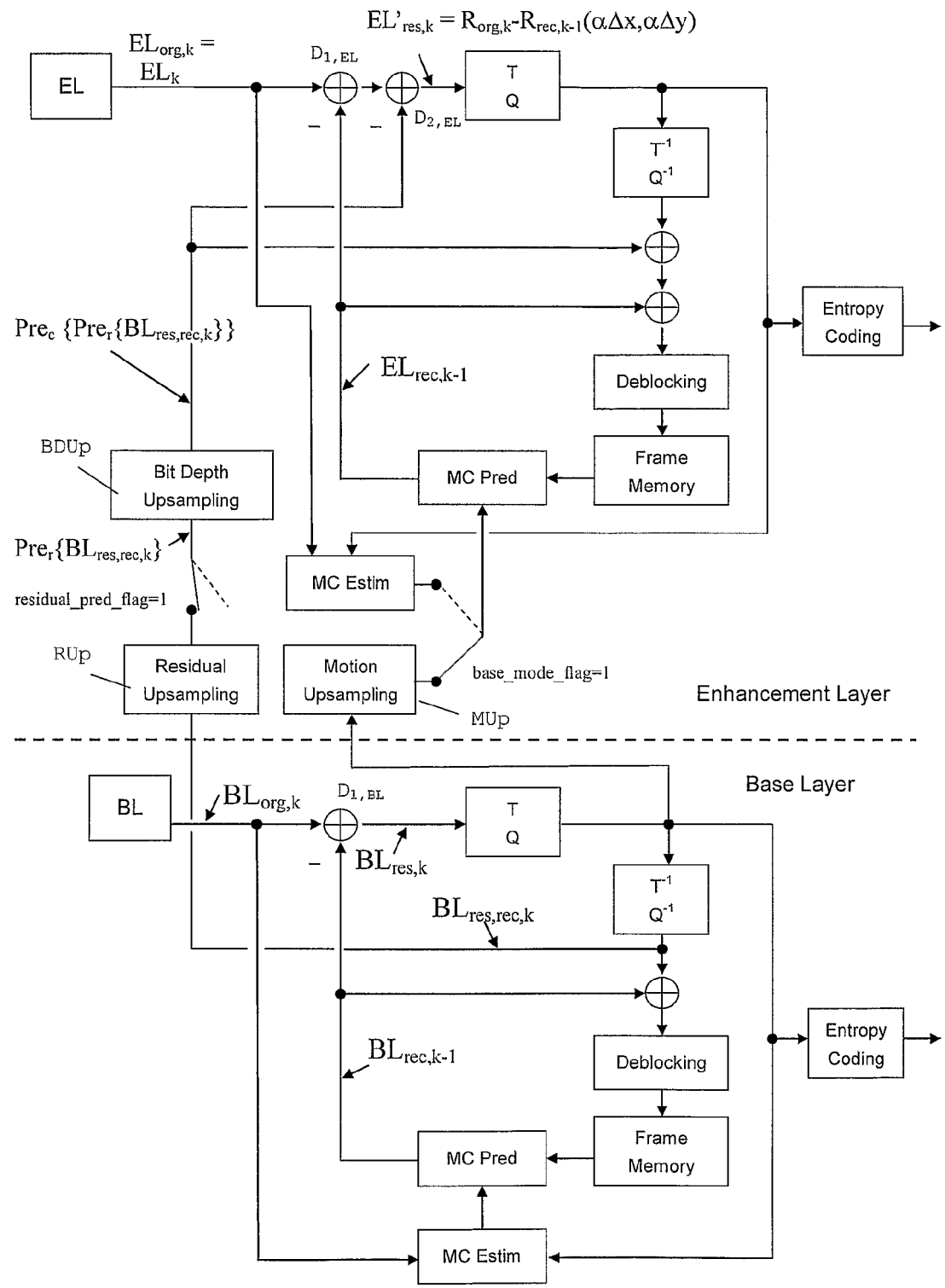
FIG. 3 an encoder for the extension of residual inter-layer prediction of spatial scalability to color bit depth scalability.

FIG. 3 shows an encoder for the extension of residual inter-layer prediction for inter-coded (P and B) macroblocks. The bit depth scalability is realized by the step of bit depth upsampling BDUp that (in this example) directly follows (spatial) residual upsampling RUp. The input to the residual upsampling RUp is the reconstructed BL residual $BL_{res,rec,k}$ which is a reconstructed version of the to-be-transmitted BL residual $BL_{res,k}$ (as expressed in Eq. (3) below). In practice, motion upsampling MUp is often done first, and then the residual upsampling RUp is done as a kind of spatial inter-layer prediction. Finally, the bit depth upsampling BDUp is done as bit depth inter-layer prediction. With the motion upsampling MUp, residual upsampling RUp and the color bit depth upsampling BDUp, a predicted version $Pre_c\{Pre_r\{BL_{res,rec,k}\}\}$ of the N-bit EL macroblock is obtained. The resulting enhancement layer residual $EL'_{res,k}$ (as defined in (Eq.3) below) is further transformed T, quantized Q and entropy encoded to form the EL sub-bitstream, like in SVC.

Different variations of the encoding process are possible, and can be controlled by control parameters. Flags shown in FIG. 3 are base_mode_flag, which controls whether EL motion compensation is based on motion vectors obtained from the EL or upsampled from the BL, and residual_pred_flag, which controls whether the BL residual is used to predict the EL residual. As shown in FIG. 2, the base_mode_flag is also used for controlling intra texture inter-layer prediction.

Figure 4:
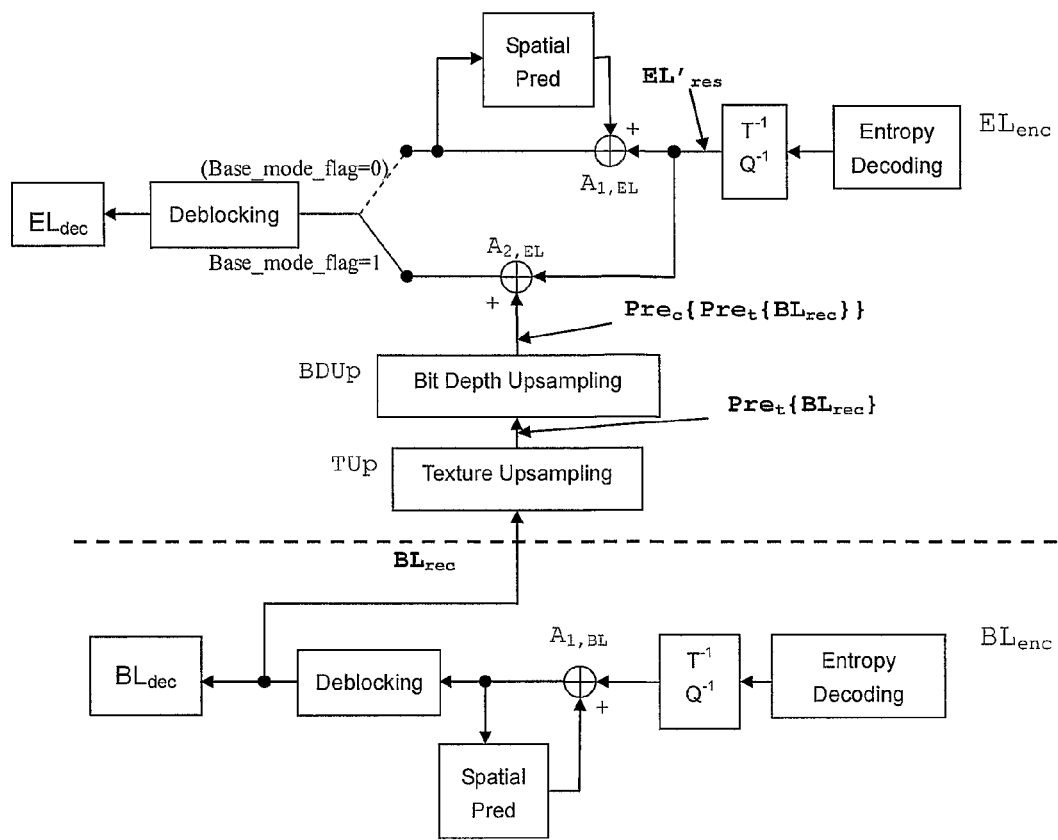
FIG. 4 a decoder for the extension of the intra texture inter-layer prediction of spatial scalability to color bit depth scalability.

FIG. 4 shows an exemplary decoder for intra coded BL images that utilizes inter-layer prediction. After receiving encoded BL and EL information, e.g. in a multiplexed packetized bitstream, and separating BL from EL information, the BL information as well as EL information is entropy decoded. Then inverse quantization $Q^{-1}$ and inverse transformation $T^{-1}$ are applied. For the BL, the processing is the same as for conventional SVC: the images are reconstructed using spatial intra prediction, i.e. based on previously reconstructed information of the same image. After deblocking, the resulting BL signal $BL_{rec}$ can be displayed on a standard SVC display with 8 bit color depth, as described above. Alternatively however this signal can also be used to generate a predicted version of the collocated EL image $Pre_c\{Pre_t\{BL_{rec}\}\}$: for this purpose it is texture upsampled TUp, wherein a texture predicted version of the EL image $Pre_t\{BL_{rec}\}$ is obtained, which is then bit depth upsampled BDUp. The texture and bit depth upsampled reconstructed BL image $Pre_c\{Pre_t\{BL_{rec}\}\}$ is then used to update $A_{2,EL}$ the improved, inverse quantized and inverse transformed EL residual $EL'_{res}$, thereby obtaining a signal that after deblocking can be output as EL video $EL_{rec}$ for HQ displays.

Of course a decoder that is operated in EL mode generates internally also the BL video $BL_{rec}$, since it is required for EL prediction, but the BL video needs not necessarily be available at the decoder output. In one embodiment the decoder has two outputs, one for BL video $BL_{rec}$ and one for EL video $EL_{rec}$, while in another embodiment it has only an output for EL video $EL_{rec}$.

As described above for the intra encoder of FIG. 2, also the decoder can work in different modes corresponding to the encoding. Therefore respective flags are extracted from the bitstream and evaluated, e.g. an indication Base_mode_flag that decides whether or not inter-layer prediction is used. If not, EL images are conventionally reconstructed using deblocking, spatial prediction and update $A_{1,EL}$ of the spatially predicted image.

Figure 5:
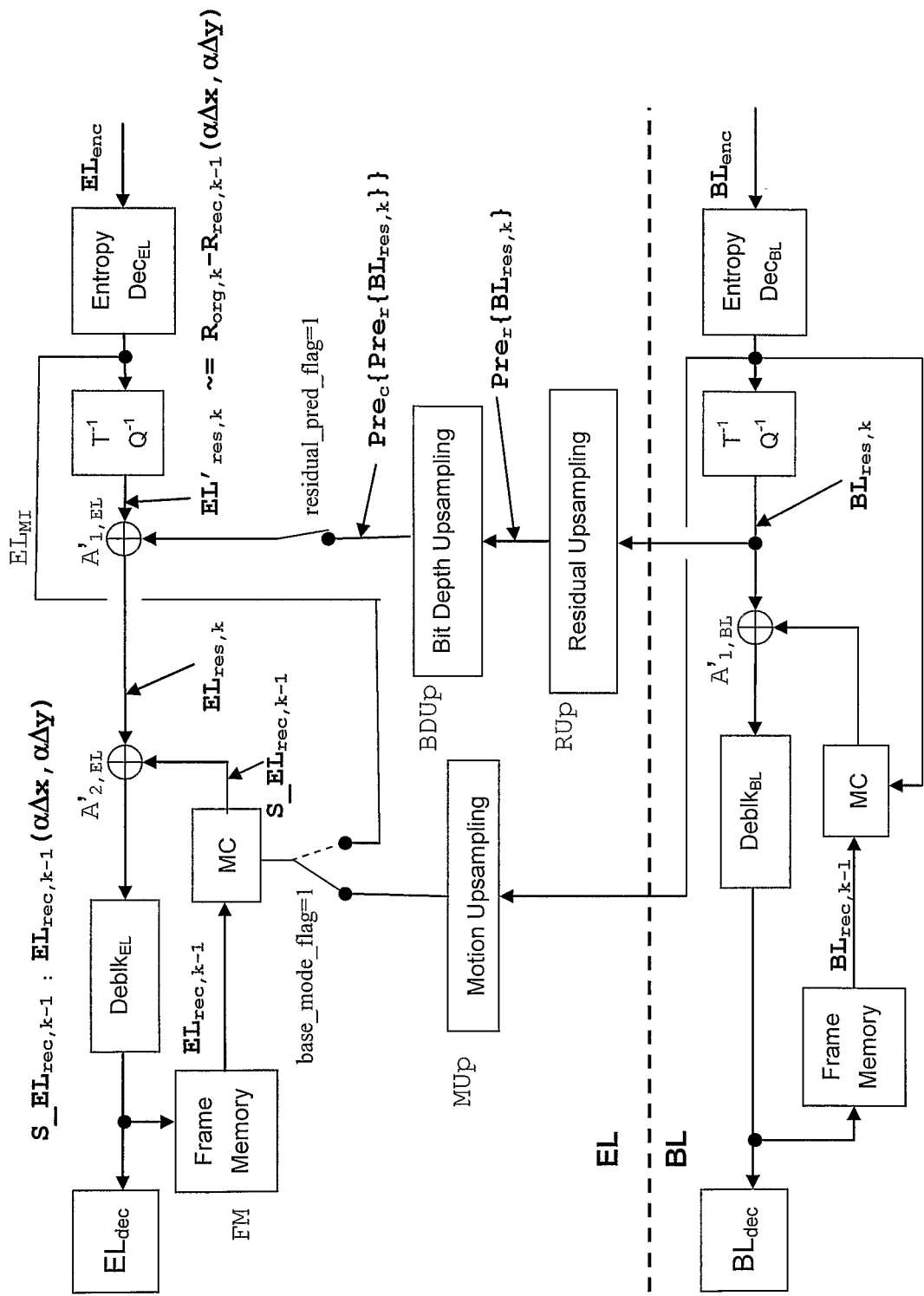
FIG. 5 a decoder for the extension of residual inter-layer prediction of spatial scalability to color bit depth scalability.

FIG. 5 shows an exemplary decoder for inter-coded units, e.g. inter-coded MBs. From a BL bitstream, which may have been entropy coded and is correspondingly decoded, in one embodiment motion data are detected and extracted and can be upsampled for the EL if required. This can be indicated by an indication that is included in the BL or EL bitstream. Further, BL bitstream data are inverse quantized $Q^{-1}$ and inverse transformed $T^{-1}$, whereby a reconstructed BL residual $BL_{res,k}$ is obtained. If a BL video signal $BL_{dec}$ is required, further BL processing includes conventional SVC decoding including deblocking, storage in a frame memory, motion compensation and updating the motion compensated prediction image with the residual $BL_{res,k}$. If only an EL video signal is required, these steps can be omitted.

The residual $BL_{res,k}$ is used for predicting EL data: it is upsampled by residual upsampling RUp, which is a kind of spatial upsampling i.e. the number of values is increased, and bit depth upsampling i.e. the bit depth and thus the possible range of each value is increased BDUp, to produce a predicted signal $Pre_c\{Pre_r\{BL_{res,k}\}\}$. If the collocated EL unit has been encoded using residual inter-layer prediction, as indicated by a flag residual_pred_flag, the predicted residual $Pre_c\{Pre_r\{BL_{rec}\}\}$ is used to update A'$_1$ the received, inverse quantized and inverse transformed EL residual $EL'_{res,k}$, whereby the actual EL residual $EL_{res,k}$ is obtained. The received, inverse quantized and inverse transformed EL residual $EL'_{res,k}$ is in principle equivalent to the difference between the conventional spatial EL residual $R_{org}$ and a residual $R_{rec,k-1}(\alpha\Delta x, \alpha\Delta y)$ that was reconstructed in the encoder from a previous unit k−1 and then upsampled.

The further EL processing is in principle like in SVC (however using enhanced bit depth): the reconstructed residual $EL_{res,k}$ is used to update a predicted EL image $S\_EL_{rec,k-1}=EL_{rec,k-1}(\alpha\Delta x, \alpha\Delta y)$ with steps of deblocking $Deblk_{EL}$, storage in a frame memory FM and motion compensation MC of the reconstructed image $EL_{rec,k-1}$. If the received enhancement layer data $EL_{enc}$ contains motion information $EL_{MI}$, the motion information is extracted and can be provided to the motion compensation unit MC. Alternatively the upsampled MUp motion information from the BL can be used.

Figure 6:
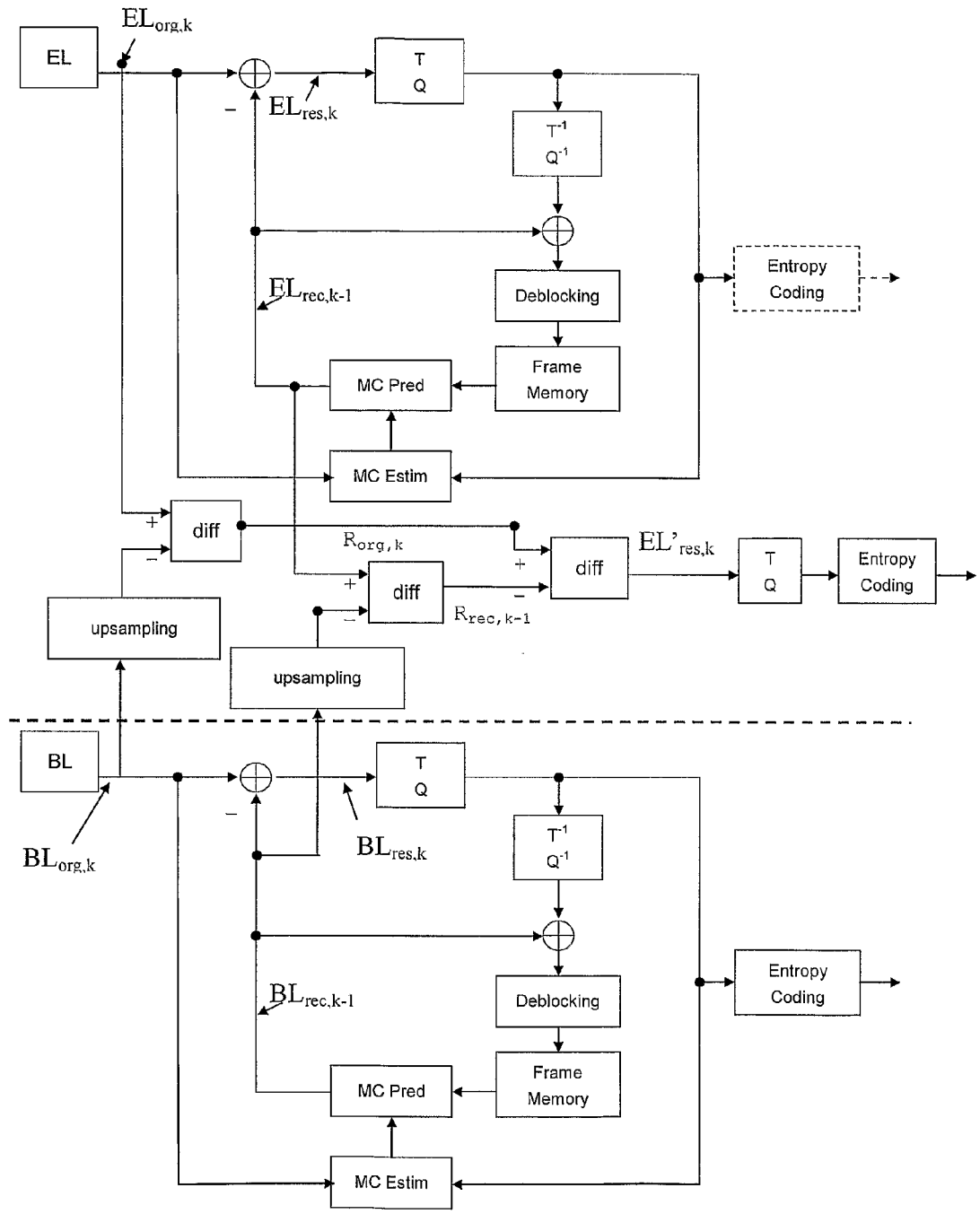
FIG. 6 a logical equivalent of the framework of the extension of residual inter-layer prediction of spatial scalability to color bit depth scalability.

Apparently the improved EL residual according to the invention is different from that defined in SVC spatial scalability. However, its encoding is in principle equivalent to inter encoding the difference between the original EL macroblock $EL_{org,k}$ and the texture (spatially) and bit depth upsampled BL macroblock $Pre_c\{Pre_r\{BL_{org,k}\}\}$, as shown in FIG. 6 and proven below.

Assume that both the residual upsampling operator $Pre_r\{\ \}$ and the color bit depth inter-layer prediction operator $Pre_c\{\ \}$ have the attribute of additivity and stability. In practice the residual upsampling operation that is employed in current SVC spatial scalability is of additivity and stability[1]. In the following it is proved that encoding of the redefined EL residual $EL'_{res,k}$ is equivalent to inter encoding of the difference between the original EL MB and the reconstructed EL macroblock (motion upsampled, residual upsampled and then color bit depth upsampled version of the collocated BL macroblock). The difference between the EL macroblock and the residual upsampled and then bit depth upsampled version of the collocated BL macroblock) is named inter-layer residual and is defined as follows:

$$R_k = EL_k - Pre_c\{Pre_r\{BL_k\}\},  \quad (Eq.2)$$

where k represents the POC (picture order count) of the current frame.

[1] In the case of continuous functions, "stability" is equivalent to derivativeness; in the case of discrete functions, "stability" means that at any available values of the independent variable, the absolute value of the change of the discrete function is no greater than the absolute value of the change of the independent variable multiplied by a constant.

Without loss of generality, we assume that the following two conditions are satisfied: first, the current MB has only one reference MB, with the POC of the current MB frame equals k and the POC of the reference MB frame equals (k−1); second, there are only two spatial layers. Based on the two assumptions, the proof for Eq. (2) is as follows.

$$EL'_{res,k} = EL_{org,k} - EL_{rec,k-1}(\alpha\Delta x, \alpha\Delta y) - \quad (Eq.\ 3)$$
$$Pre_c\{Pre_r\{BL_{res,k}\}\}$$
$$= EL_{org,k} - EL_{rec,k-1}(\alpha\Delta x, \alpha\Delta y) -$$
$$Pre_c\{Pre_r\{BL_{org,k} - BL_{rec,k-1}(\Delta x, \Delta y)\}\}$$

where $(\Delta x, \Delta y)$ represents the motion vector of the current k-th BL macroblock, $\alpha$ represents the spatial resolution scaling factor of the EL, $BL_{rec,k-1}(\Delta x, \Delta Y)$ represents the motion compensated version of the reconstructed (k−1)-th BL macroblock, and $EL_{rec,k-1}(\alpha\Delta x, \alpha\Delta y)$ represents the motion (upsampled motion) compensated version of the reconstructed (k−1)-th EL macroblock.

According to the assumption that both $Pre_r\{\ \}$ and $Pre_c\{\ \}$ have the attribute of additivity, Eq. (3) is equivalent to:

$$EL'_{res,k} = EL_{org,k} - EL_{rec,k-1}(\alpha\Delta x, \alpha\Delta y) - \quad (Eq.\ 4)$$
$$Pre_c\{Pre_r\{BL_{org,k}\}\} +$$
$$Pre_c\{Pre_r\{BL_{rec,k-1}(\Delta x, \Delta y)\}\}$$
$$= (EL_{org,k} - Pre_c\{Pre_r\{BL_{org,k}\}\}) -$$
$$\begin{pmatrix} EL_{rec,k-1}(\alpha\Delta x, \alpha\Delta y) - \\ Pre_c\{Pre_r\{BL_{rec,k-1}(\Delta x, \Delta y)\}\} \end{pmatrix}$$

According to the assumption that both $Pre_r\{\ \}$ and $Pre_c\{\ \}$ have the attribute of stability, substitute Eq. (2) into Eq. (4):

$$EL'_{res,k} \approx R_{org,k} - R_{rec,k-1}(\alpha\Delta x, \alpha\Delta y) \quad (Eq.5)$$

Eq. (5) shows that the redefined EL residual $EL'_{res,k}$ is equivalent to the difference between the inter-layer residual $R_{org,k}$ of the original BL macroblock $BL_{org,k}$ and the original EL macroblock $EL_{org,k}$ and the inter-layer residual $R_{rec,k-1}$ of the motion compensated reconstructed reference BL macroblock $BL_{rec,k-1}$ and the motion (upsampled motion) compensated reconstructed reference EL macroblock $EL_{rec,k-1}$. This is shown in FIG. 6. In other words, the inter-layer residual is inter-coded. However, the encoding shown in FIG. 5 is advantageous since it is simpler.

One advantage of the presented extension of the spatial scalability to bit depth scalability is that neither a new syntax element nor a new prediction mode is needed to realize the extension to color bit depth scalability. Another advantage, particularly for inter coding, is that a high coding efficiency is obtained because the finally encoded EL residual is "the residual of the residual", and therefore equivalent to inter encoding of the inter-layer residual as defined in (Eq.3). In practice, the final coded EL residual in inter coding is equivalent to the original EL macroblock minus the motion (upsampled motion) compensated reconstructed reference EL macroblock and then minus the motion compensated, residual upsampled and then bit depth upsampled version of the collocated BL reconstructed residual.

A further advantage is that for the case of inter coding there is no need to reconstruct the BL macroblocks. Thus, BL reconstruction can be skipped, which makes the decoder simpler.

Advantageously, the intra coding of the color bit depth scalability is realized by the presented intra color bit depth inter-layer prediction that in one embodiment directly follows the intra texture inter-layer prediction. For this embodiment, there is in the case of SVC no new syntax element or new prediction mode needed for the intra color bit depth inter-layer prediction.

Thus, the invention can be used for scalable encoders, scalable decoders and scalable signals, particularly for video signals or other types of signals that have different quality layers and high inter-layer redundancy.

It will be understood that the present invention has been described purely by way of example, and modifications of detail can be made without departing from the scope of the invention. Each feature disclosed in the description and (where appropriate) the claims and drawings may be provided independently or in any appropriate combination. Features may (where appropriate) be implemented in hardware, software, or a combination of the two. Reference numerals appearing in the claims are by way of illustration only and shall have no limiting effect on the scope of the claims.

The invention claimed is:

1. A method for encoding video data having a base layer and an enhancement layer, wherein the base layer has lower color resolution and lower spatial resolution than the enhancement layer, the method comprising the steps of:

upsampling base layer information, wherein a predicted version of enhancement layer information is obtained that has higher value bit depth resolution and higher spatial resolution than the base layer, wherein, in a case of Inter coded base layer information, base layer residual data are upsampled by residual upsampling to obtain residual upsampled data and by subsequent color bit depth upsampling of the residual upsampled data and base layer motion information data are upsampled by motion upsampling, and wherein in a case of Intra coded base layer information texture of reconstructed base layer image data is upsampled by texture upsampling to obtain texture upsampled data and by subsequent color bit depth upsampling of said texture upsampled data;

generating an enhancement layer residual being the difference between the enhancement layer information and said predicted version of enhancement layer information; and encoding the base layer information and the enhancement layer residual.

2. The method according to claim 1, wherein in the case of Inter coded base layer information, said motion upsampling of base layer motion information data can be enabled or disabled by a first parameter, and said residual upsampling and subsequent color bit depth upsampling can be enabled or disabled by a different second parameter.

3. A method for decoding video data having a base layer and an enhancement layer, the method comprising the steps of:

receiving enhancement layer information and base layer information;

performing inverse quantization and inverse transformation on the received information;

upsampling inverse quantized and inverse transformed base layer information, wherein a number of pixels and a value depth per pixel are increased in a color bit depth upsampling step and wherein predicted enhancement layer information is obtained, and wherein in a case of Inter coded base layer information, base layer residual data are upsampled in a residual upsampling step to obtain residual upsampled data, wherein prior to said color bit depth upsampling step includes color bit depth upsampling of the residual upsampled data, and base layer motion information data are upsampled in a motion upsampling step, and in a case of Intra coded base layer information, texture of reconstructed base layer residual data is upsampled in a texture upsampling step to obtain texture upsampled data, wherein said color bit depth upsampling includes color bit depth upsampling of the texture upsampled data; and reconstructing from the predicted enhancement layer information and the inverse quantized and inverse transformed enhancement layer information reconstructed enhancement layer video information.

4. The method according to claim 3, wherein the inverse quantized and inverse transformed enhancement layer information comprises residual information, further comprising the steps of reconstructing base layer video from the inverse quantized and inverse transformed base layer information and adding said residual information to said predicted version of enhancement layer information.

5. The method according to claim 3, wherein the inverse quantized and inverse transformed enhancement layer information comprises enhancement layer residual information and the inverse quantized and inverse transformed base layer information comprises base layer residual information, and wherein said step of upsampling inverse quantized and inverse transformed base layer information comprises upsampling said base layer residual information, further comprising the step of adding said enhancement layer residual information and said upsampled base layer residual information, wherein a reconstructed enhancement layer residual is obtained.

6. The method according to claim 3, wherein said step of reconstructing further results in a reconstructed enhancement layer residual being obtained, said method further comprising the step of adding the reconstructed enhancement layer residual to reconstructed, motion compensated enhancement layer information.

7. The method according to claim 3, further comprising the steps of extracting from the received enhancement layer motion information and reconstructing enhancement layer video, wherein said enhancement layer motion information is used.

8. The method according to claim 3, wherein for the base layer steps of deblocking, storage in a frame memory, motion compensation and updating the base layer motion compensated prediction image with the base layer residual are not performed if a base layer video signal is not required.

9. An apparatus for encoding video data having a base layer and an enhancement layer, wherein the base layer has lower color resolution and lower spatial resolution than the enhancement layer, comprising:

means for upsampling base layer information, wherein a predicted version of enhancement layer information is generated that has higher color bit depth resolution and higher spatial resolution than the base layer information, and wherein, in a case of Inter coded base layer information, base layer residual data are upsampled in a residual upsampling unit to obtain residual upsampled data and subsequently in a color bit depth upsampling unit, which performs color bit depth upsamplinq of the residual upsampled data, and base layer motion information data are upsampled in a motion upsampling unit, and wherein in a case of Intra coded base layer information texture of reconstructed base layer image data is upsampled in a texture upsampling unit to obtain texture upsampled data and subsequently in the color bit depth upsampling unit, which performs color bit depth upsamplinq of the texture upsampled data;

means for generating an enhancement layer residual being the difference between the enhancement layer information and said predicted version of enhancement layer information; and means for encoding the base layer information and means for encoding the enhancement layer residual.

10. An apparatus for decoding video data having a base layer and an enhancement layer, comprising:

means for receiving enhancement layer information and means for receiving base layer information;

means for performing inverse quantization and inverse transformation on the received information;

means for upsampling inverse quantized and inverse transformed base layer information, wherein a number of pixels and a value depth per pixel are increased and wherein predicted enhancement layer information is generated, and wherein base layer residual data is upsampled to obtain residual upsampled data and base layer motion information data is upsampled in a case of Inter coded base layer information, and texture of reconstructed base layer residual data is upsampled to obtain texture upsampled data in a case of Intra coded base layer information, and wherein the upsampling of the base layer residual data and the texture of reconstructed base layer residual data respectively is performed prior to increasing the number of pixels and the value depth per pixel, wherein the increasing of the number of pixels and the value depth per pixel is performed on the residual upsampled data in the case of Inter coded base layer information and wherein the increasing of the number of pixels and the value depth per pixel is performed on the texture upsampled data in the case of Intra coded base layer information; and means for reconstructing from the predicted enhancement layer information and the inverse quantized and inverse transformed enhancement layer information reconstructed enhancement layer video information.

11. The apparatus according to claim 10, wherein the means for upsampling comprises means for increasing the number of pixels and means for increasing the number of values that each pixel can have.

12. The apparatus for decoding according to claim 10, wherein the apparatus has an output for reconstructed enhancement layer data, but no output for reconstructed base layer data.

* * * * *